July 31, 1923.
R. C. MONAHAN
MACHINE TOOL
Filed April 10, 1920
1,463,764
4 Sheets-Sheet 3
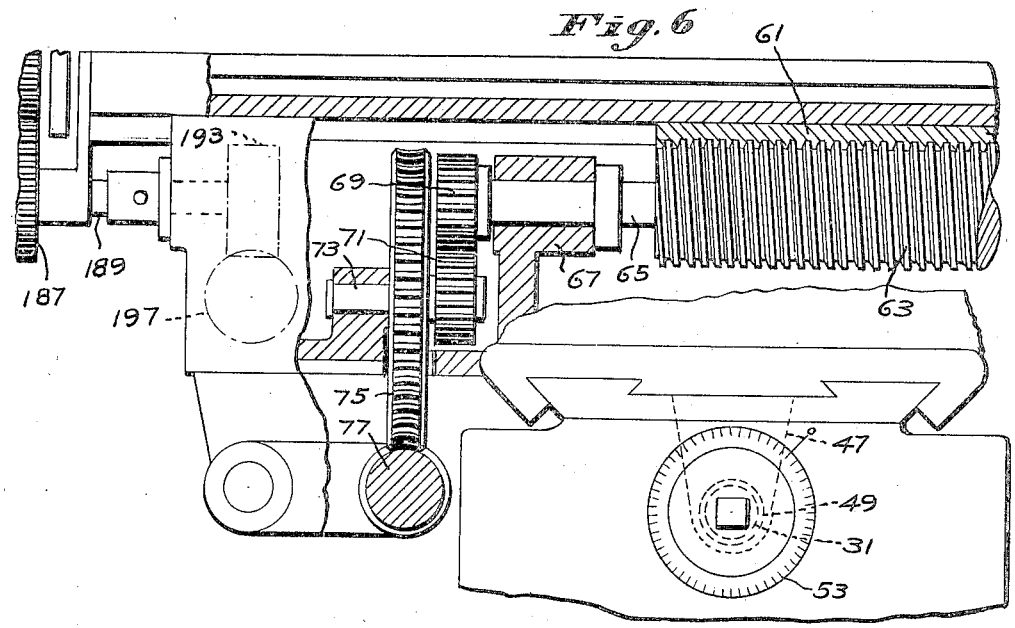
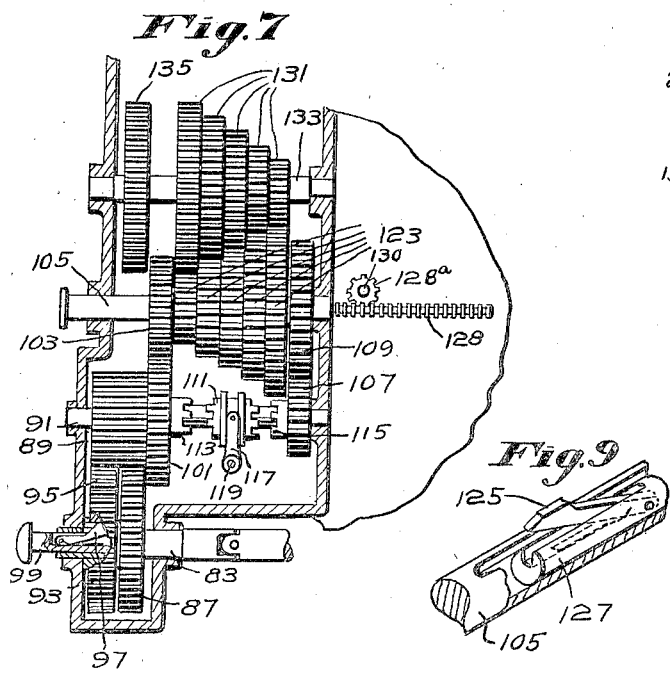
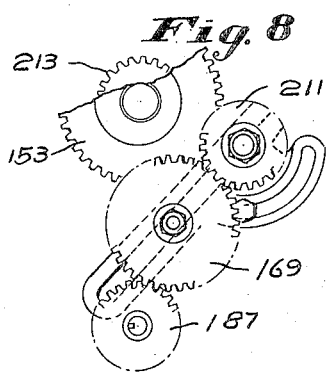
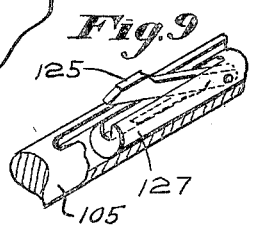
Inventor
Richard C. Monahan
By Robt. P. Harris
Attorney July 31, 1923.
R. C. MONAHAN
MACHINE TOOL
Filed April 10, 1920
1,463,764
4 Sheets-Sheet 4
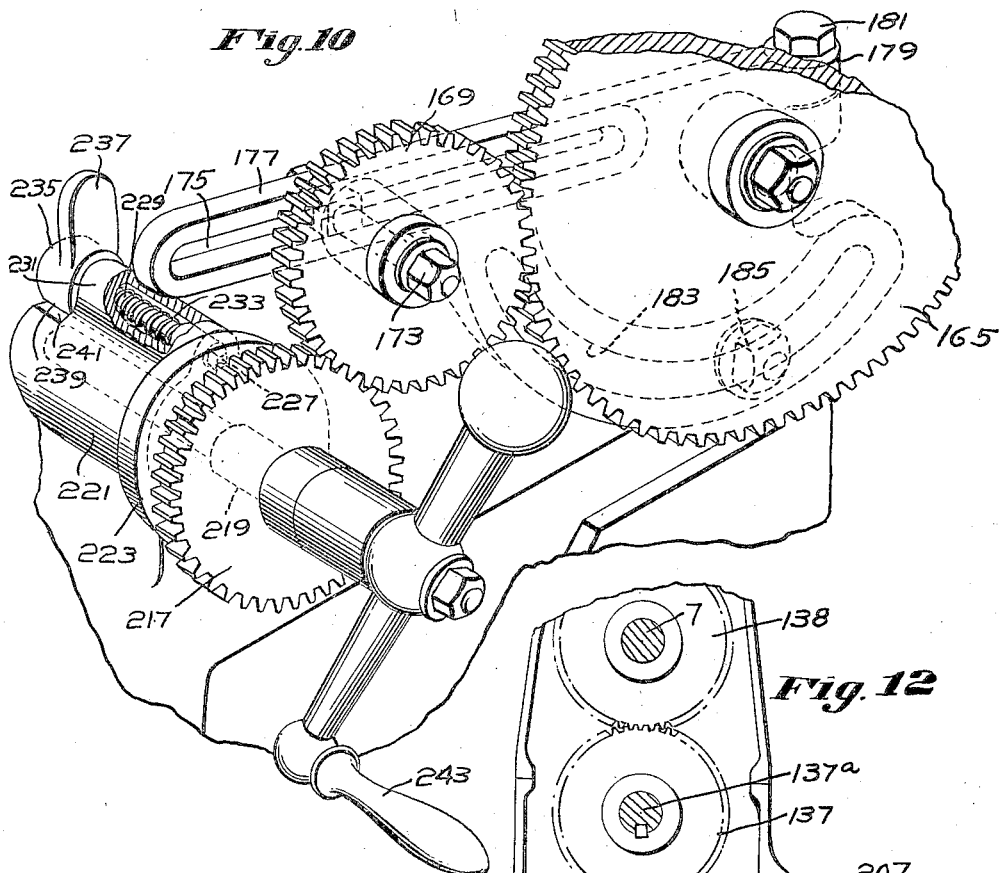
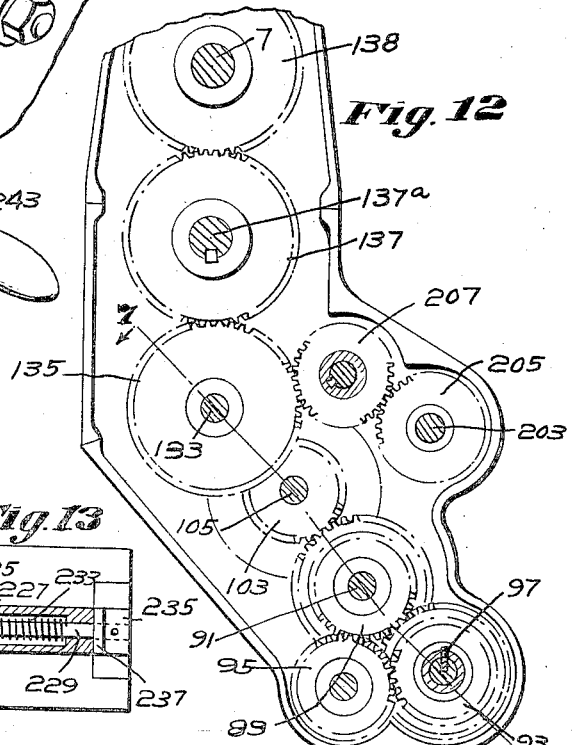
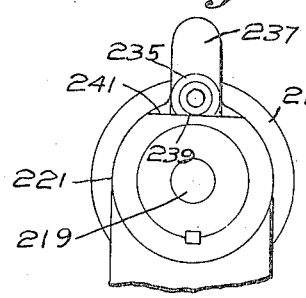
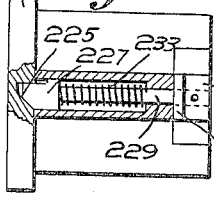
Inventor
Richard C. Monahan
by Rob't P. Harris,
Attorney Patented July 31, 1923.

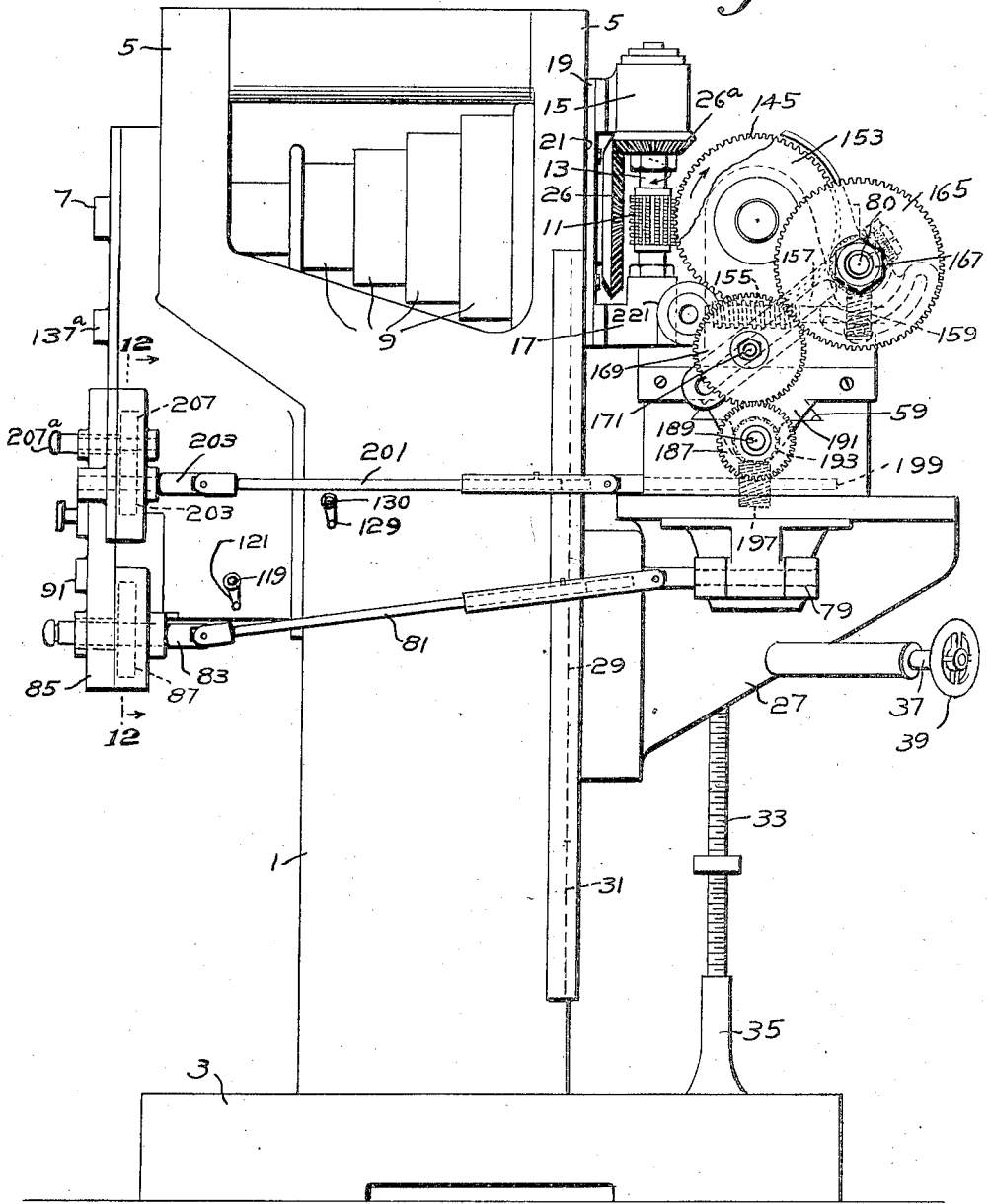

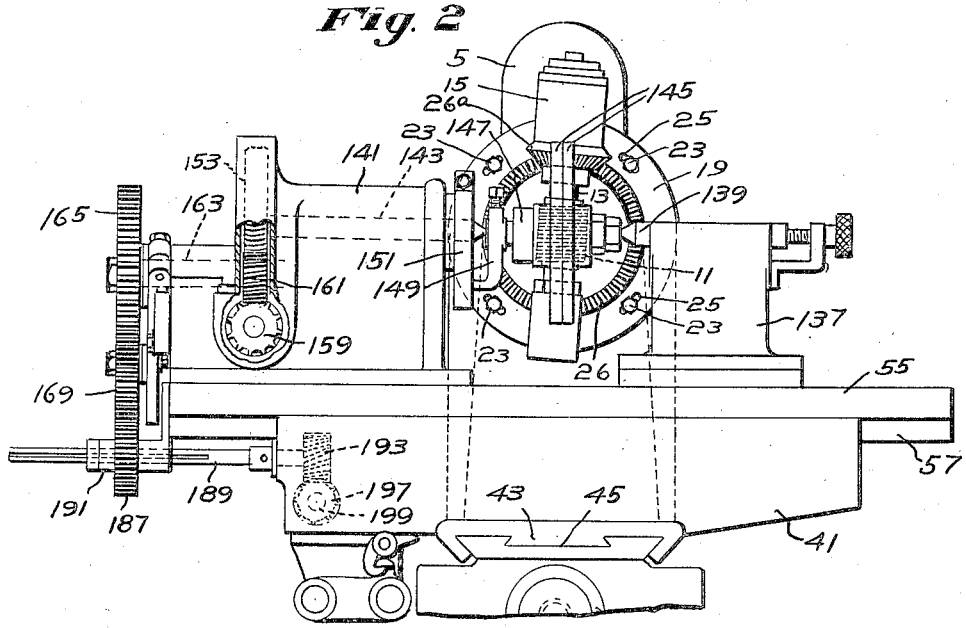
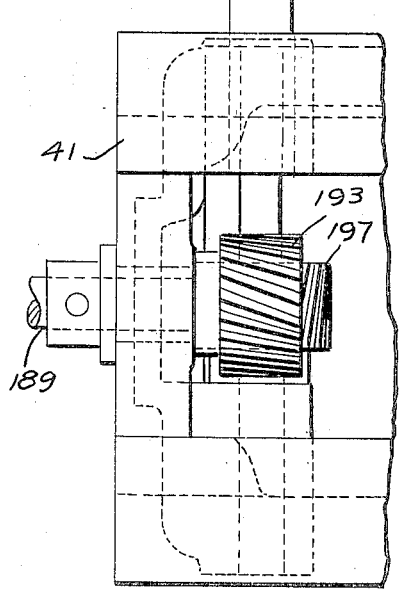
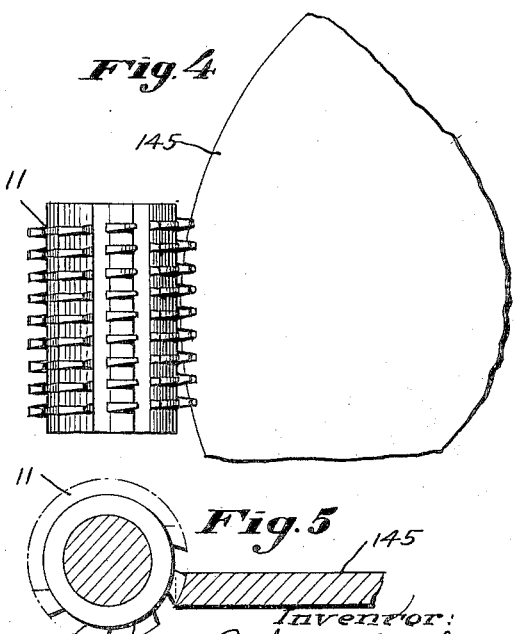

1,463,764

UNITED STATES PATENT OFFICE.

RICHARD C. MONAHAN, OF WATERTOWN, MASSACHUSETTS, ASSIGNOR TO NATIONAL MACHINE & TOOL COMPANY, OF BOSTON, MASSACHUSETTS, A CORPORATION OF MAINE.

MACHINE TOOL.

Application filed April 10, 1920. Serial No. 372,956.

*To all whom it may concern:*

Be it known that I, RICHARD C. MONA-HAN, a citizen of the United States, residing at Watertown, in the county of Middlesex and State of Massachusetts, have invented an Improvement in Machine Tools, of which the following description, in connection with the accompanying drawings, is a specification, like characters on the drawings representing like parts.

The invention to be hereinafter described relates to machine tools, and more particularly to machines for cutting teeth of gears and for other purposes.

Machines of this type usually comprise a standard carrying a spindle for rotating a cutter, and a work support or table mounted on a saddle, mounted in turn on a knee carried by the standard. The gear blank or work is mounted on a spindle carried by the table, and it is necessary in generating the teeth on the gear blank to feed the latter bodily with respect to the cutter, and also to impart a rotative feed to the blank to generate the teeth thereon.

Heretofore, the bodily feed of the blank has been effected through the feed of the table, which is usually effected by a nut on the table engaging a feed screw mounted in the saddle and driven at various speeds by a flexible extensible shaft extending from the feed screw to a gear box containing speed change gears mounted on the standard. To impart the rotative feed to the gear blank, an index head has been mounted on the table and provided with a spindle driven by gearing extending from the spindle to the feed screw shaft for the table.

Consequently, in determining the rotative feed speed of the index head spindle, necessary to rotate the gear blank or work at the proper speed, it has been necessary to establish a predetermined ratio of speed between the table feed and the index head spindle feed. This is usually done by consulting a table and adjusting a gear change handle carrying a pin, with respect to series of holes in an index dial. This calls for intelligence and skill on the part of the operator, and there is also a liability that he will make an error in consulting the table or in adjusting the handle pin with respect to the holes in the dial, so that the proper rotative speed of the index head spindle will not be obtained to produce the rotative speed of the gear blank required. Also, since the index head spindle is driven from the table feed screw shaft with a predetermined ratio feed, the speed of feed of the table and the blank with respect to the cutter is limited by the rotative speed of feed of the blank. As a consequence, it has been impossible to cut the teeth of gears with the speed desired. For example, in cutting gear teeth on brass blanks, the table and blank should be fed more rapidly than when cutting gear teeth on steel blanks, but with the old form of machine the feed speeds in cutting on metals of different hardness had to be the same.

One of the purposes of the present invention, therefore, is to provide means for rotatively feeding the gear blank or work with respect to the cutter, independently of the means for feeding the table and the gear blank or work carried thereby with respect to the cutter. As a result, the table and work may be fed as rapidly as the material operated upon will permit, and the capacity of the machine is materially increased.

Another purpose of the invention is to provide simple and efficient driving means for rotating the work at the proper speed without the necessity for consulting a table or adjusting a crank carried pin with respect to series of holes in a dial plate. In carrying this feature of the invention into practical effect, in the present instance, the driving means for imparting the rotative feed to the work includes an index gear which may have a number of teeth, circular pitch and diameter, the same as the gear to be produced, or of predetermined ratio with respect to the gear to be produced, so that the operator may readily select from a number of such index gears the gear having the characteristics of the gear desired to be produced, and then he may introduce such gear into the machine and be sure that the gear blank will be rotated with respect to the cutter at the proper feed to produce the gear desired. This obviously does not call for the services of a trained and skilled operator, and therefore, the field of use of the machine is desirably extended to places where skilled labor is not employed.

In some cases it may be desirable to make a groove or cut in a blank, and then manually to index the blank and make one or more cuts or grooves in a blank. The machine may be so constructed that the automatic rotative feed of the work may be replaced by manual feed of the work.

With the aforesaid and other purposes in view, the character of the invention will be best understood by reference to the following description of one good form thereof shown in the accompanying drawings, wherein:—

Fig. 1 is a side elevation of a machine tool embodying the invention;

Fig. 2 is a front elevation of a portion of the machine;

Fig. 3 on an enlarged scale is a plan of a portion of the saddle and transmission gears carried thereby;

Fig. 4 on an enlarged scale is a side elevation of the hob cutter and a gear blank operated upon thereby;

Fig. 5 is a plan of the parts shown in Fig. 4;

Fig. 6 on an enlarged scale is a vertical section of portions of the saddle and table, and a part of the transmission for feeding the table;

Fig. 7 is a section taken on line 7—7 of Fig. 12;

Fig. 8 is a diagrammatic view of a portion of the driving mechanism for imparting the rotative feed to the work;

Fig. 9 on an enlarged scale is a sectional detail showing the device for connecting the speed change cone gears to their shaft;

Fig. 10 on an enlarged scale is a perspective view of a portion of the transmission illustrating the means for manually indexing the work;

Figs. 11 and 13 are details to be referred to; and

Fig. 12 on an enlarged scale is a vertical section taken on line 12—12 of Fig. 1.

Referring to the drawings, the machine shown therein as one good form of the invention, may be provided with any suitable support, in the present instance comprising a standard 1 mounted on a base 3. At the upper end of the standard are a pair of uprights 5 provided with bearings in which the main driving shaft spindle 7 is journalled. Cone pulleys 9 fast on the main shaft may be driven by a belt from a suitable source of power.

Any suitable form of cutting tool may be driven by the main shaft. In the present instance, a usual hob cutter 11 is shown mounted on a shaft 13 journalled in bearings 15 and 17 carried by an annular head 19. This head may receive a rotative adjustment to vary the inclination of the hob cutter shaft as required. To accomplish this, the head 19 may be secured to the face 21 of one of the uprights 5 by screw bolts 23 (Fig. 2) entered through elongated slots 25 in said head, and threaded into said face. The construction is such that on releasing the screws, the head may be given a rotative adjustment to furnish the inclination of the hob cutter shaft required, and then the screw bolts may be tightened to secure the head to said face in this position of adjustment. The hob cutter shaft 13 may be driven from the spindle 7 by a bevel gear 26 fast on the spindle meshing with a bevel gear 26ª on the shaft 13, in the present instance, the bevel gear 26 being twice the diameter of the bevel gear 26ª so as to drive the latter at twice the speed of the former.

Suitable means may be provided to support the work to be operated upon by the cutter, in the present instance, in the form of a knee 27 (Fig. 1) having a dove-tail projection 29 adapted to slide in a similarly shaped groove 31 at the front of the standard 1. To adjust and support the knee in different positions of vertical adjustment, a screw 33 may be mounted in a foot 35 on the base 3, and may be operatively connected with the knee and adjusted by usual gear connections under the control of a shaft 37 provided with a hand wheel 39.

Mounted on the knee is a saddle 41 having a dove-tail projection 43 at the bottom thereof adapted to slide in a similarly shaped groove 45 at the top of the knee. To adjust the saddle along the knee toward and from the standard, the saddle may be provided with a bracket 47 (Fig. 6) depending therefrom and carrying a nut 49 receiving a screw 51 mounted on the saddle and adapted to be rotated by a hand wheel 53.

Mounted on the saddle is a table 55 having a dove-tail projection 57 adapted to slide in a similarly shaped groove 59 (Fig. 1) in the saddle.

Suitable means may be provided automatically to feed the table along the saddle. This means, in the present instance, comprises a rack 61 (Fig. 6) fast on the table and adapted to mesh with a feed screw 63 on a shaft 65 journalled in bearings 67 mounted in the saddle. At one end of said shaft is a gear 69 meshing with a gear 71 on a stub shaft 73 journalled in a bearing on the saddle. Fast on the stub shaft is a worm gear 75 meshing with a worm 77 on a shaft 79 (Fig. 1) journalled in bearings carried by the saddle. A flexible extensible shaft 81 has one end connected to the worm shaft 79, and its opposite end connected to a shaft 83 journalled in bearings in a gear box 85 mounted on the standard.

Suitable means may be provided to drive the shaft 83 at various speeds and in opposite directions as required. To accomplish this, in the present instance, a gear 87 (Fig. 7) loose on the shaft 83 meshes with a wide-faced gear 89 fast on a countershaft 91 journalled in bearings in the gear box. A gear 93 loose on the shaft 83 meshes with an intermediate gear 95 meshing in turn with the wide-faced gear 89. The gears 87 and 93 may be alternatively connected to the shaft 83 by a usual key 97 slidably mounted in the shaft 83 and under the control of a handle 99. The construction is such that when the gear 87 is connected by the key to the shaft 83, it will be driven by the wide-faced gear to feed the table in one direction, and when the gear 93, on the other hand, is connected to the shaft 83, it will be driven from the wide-faced gear through the intermediate gear 95 to feed the table in the opposite direction.

To rotate the countershaft 91 a large gear 101 may be mounted loose on the countershaft 91, and may mesh with a pinion 103 on a shaft 105 journalled in bearings in the gear box. To rotate the countershaft at a slower speed, a pinion 107 may be mounted loose on the countershaft and may be driven by a gear 109 fast on the shaft 105. To alternatively connect the gear 101 and pinion 107 to the countershaft, a clutch 111 may be splined to the shaft 91 and have clutch teeth for engagement with clutch teeth 113 on the hub of the gear 101, and may have clutch teeth to engage the clutch teeth 115 on the pinion 107. The clutch may be connected by a yoke 117 with a rock shaft 119 projecting beyond the gear box, where it receives a handle 121 (Fig. 1).

The construction is such that the handle may be grasped to rock the shaft and shift the clutch 111 so as to connect the gear 101 or the pinion 107 with the shaft 91 as desired.

To provide further speeds of feed for the table, a series of cone gears 123 may be mounted loose on the shaft 105, and may be alternatively connected with said shaft by a spring-pressed key 125 (Fig. 9) carried by a solid shaft 127 mounted in the shaft 105, and shifted by a rack 128 and a pinion 128ª controlled by a handle 129 at one end of a shaft 130.

Meshing with the cone gears 123 are a series of cone gears 131 fast on a shaft 133 journalled in bearings in the gear box. The construction is such that by adjustment of the handle knob 129 and key 127, the drive from the shaft 133 to the shaft 105 may be effected through any of the pairs of meshing gears of the series of cone gears 123 and 131.

To rotate the shaft 133, a gear 135 may be mounted fast thereon and mesh with a gear 137 (Fig. 12) fast on a shaft 137ª journalled in bearings in the gear box and driven by a shaft 138 fast on the spindle 7 referred to. By the train of gearing described, the table may be fed from the main shaft in opposite directions and at a variety of speeds.

Suitable means may be provided to support the gear blank or work on the table in operative relation to the hob cutter or tool. To accomplish this, in the present instance, a tail stock 137 (Fig. 2) may be mounted on the table 55, and may be provided with a dead center 139. Also mounted on the table is a head stock 141 having a live spindle 143 journalled therein. The work, in the present instance, in the form of a pair of gear blanks 145 may be suitably secured onto an arbor 147 between the dead center 139 and live spindle. The work may be caused to rotate with the live spindle by the usual dog 149 fast on the arbor and engaging a disk 151 fast on the live spindle.

As stated, one of the purposes of the invention, is to provide means for imparting the rotative feed to the work independent of the means for feeding the table, and to provide means for readily determining and varying the speed of feed of the work for the production of gears having different characteristics as desired. This means, in the present instance, comprises a worm gear 153 (Fig. 1) fast on the live spindle 143 and meshing with a worm 155 fast on a shaft 157 journalled in bearings in the head 141. At one end of the shaft 157 is a spiral gear 159 (Figs. 1 and 2) meshing with a spiral gear 161 fast on a shaft 163 journalled in bearings in the head 141.

An index gear 165 may be mounted on the shaft 163, and be removably secured by a nut 167. This index gear may have the characteristics of the gear to be produced. That is, it may have the same number of teeth, circular pitch and diameter as the gear to be produced.

To rotate said index gear, an intermediate gear 169 (Figs. 1 and 2) may be journalled on a stub shaft 171 adjustably secured by a bolt 173 in an elongated slot 175 in an arm 177 fulcrumed on the bearing for the shaft 163. This arm may have a split bearing 179 adapted to be tightened by a screw bolt 181. The arm 177 may also have an arcuate slot 183 receiving a screw bolt 185 threaded into a hole in the end of the head 141. The construction is such that the intermediate gear 169 may be adjusted along the slot 175 of the arm 177 to mesh with index gears of different sizes.

The intermediate gear 169 may mesh with a gear 187 splined on a shaft 189 journalled in a bearing in a bracket 191 depending from the table, and said shaft may be journalled in a bearing in the saddle, and be confined against axial movement with respect thereto. For convenience the gear 187 may be referred to as the driving gear for the index gear. Fast on the inner end of the shaft 189 is a spiral gear 193 meshing with a spiral gear 197 fast on a shaft 199 journalled in bearings in the saddle.

The shaft 199 may be connected by a flexible extensible shaft 201 (Fig. 1) with a shaft 203 journalled in bearings in the gear box. This shaft may be driven by a gear 205 (Fig. 12) fast on said shaft meshing with a gear 207, meshing in turn with the gear 135 referred to, on the shaft 133, said gear 207 being movable out of mesh with gears 135 and 205 under control of a handle 207a.

The gears 138, 137 and 135 are all of the same diameter, and the gear 205 is one-half the diameter of the gear 135, while the bevel gear 26a as stated, is one-half the diameter of the bevel gear 26. As a consequence, the hob cutter and the driving gear 187 will be rotated at the same speed. In the present instance, the driving gear 187 has forty teeth and the index gear 165 has eighty teeth. Therefore, the index gear will rotate one-half of a rotation, while the hob cutter and driving gear make one complete rotation, and since the spiral gears 159 and 161 have the same diameter, the worm 155 will rotate one-half of a rotation while the hob cutter and driving gear make one complete rotation. The spindle gear 153 has the same diameter and number of teeth as the index gear 165, and therefore, on one-half of a rotation of the worm 155, and a complete rotation of the hob cutter, the spindle gear 153 will rotate a distance equal to the circular pitch or $\frac{1}{80}$ of a complete rotation. The gear blank 145, in the present instance, has the same diameter as the index gear 165 and spindle gear 153. Therefore, the gear blank will rotate a distance equal to the circular pitch or $\frac{1}{80}$ of a rotation on each one-half rotation of the worm 155, and on each complete rotation of the hob cutter. In other words, the hob cutter will rotate eighty times for one complete rotation of the gear blank. As a result, in one complete rotation of the gear blank, a spur gear will be produced having eighty teeth with characteristics corresponding to the characteristics of the hob cutter.

The saddle is adjusted inward by the hand wheel 53 and screw 31 to present the gear blank in proper operative relation with respect to the hob cutter to produce teeth of the required depth. The table carrying the gear blank will receive a rectilinear travel through the automatic driving means therefor, and thereby move the blank in the direction of the axis thereof past the rotating hob cutter, and the latter will progressively cut the gear blank transversely to the plane thereof as indicated in Fig. 5, until the entire width of the blank has been traversed. The speed of feed of the table may be adjusted by the change speed mechanism in the gear box described, wholly independently of the automatic rotative feed of the gear blank, and therefore, the teeth on the blank may be cut as rapidly as the character of the material of the blank will permit.

If it be desired to cut teeth on a gear blank having a diameter different from the gear blank described, another index gear having a diameter corresponding to the gear blank may be substituted for the index gear 165. This may be readily effected by release of the nut 167. Then the index gear 165 may be removed, and a new index gear substituted therefor. The intermediate gear 169 is then adjusted along the slot 175 of the arm 177 to bring the same in proper mesh with the index gear, and the arm is given a rocking adjustment so that the intermediate gear will also properly mesh with the driving gear 187.

For example, if it is desired to produce a gear having the same diameter as the driving gear 187, an index gear 211 having forty teeth (Fig. 8) may be substituted in place of the index gear 165, and a gear blank 213 having the same diameter as the index gear may be mounted on the arbor 147 between the live and dead centers. Then the saddle is fed inward by the hand wheel 53 and screw 51 to bring the smaller gear blank in proper operative relation with respect to the hob cutter to produce the depth of cut on the blank required. The table may then be fed and the gear blank rotated by the independent driving means therefor as before. The driving gear will rotate the index gear at the same speed as the driving gear. The substitution of the index gear 211 for the larger index gear 165 will change the ratio of speed of the worm and the hob cutter, so that the worm will rotate the gear 153 a greater distance than before on each complete rotation of the worm, but the gear blank of smaller diameter than the gear blank first described will be advanced a distance equal to the circular pitch of the gear to be produced. In the present instance, the gear blank will be rotated $\frac{1}{40}$ of a rotation for each complete rotation of the worm, and for each complete rotation of the hob cutter. Therefore, when the hob cutter makes forty rotations, the gear blank will make one complete rotation and forty teeth will be formed thereon.

While merely two index gears have been shown herein, it will be understood that a number of index gears of different sizes and characteristics may be supplied with the machine in order to furnish a substantial range of selection of index gears for the production of a variety of gears.

In some instances the gears supplied with the machine may not have the same size as the gear to be produced. For example, it may be desired to produce a gear having sixty teeth, by the use of an index gear having thirty teeth. To accomplish this, it will merely be necessary to substitute a driving gear having sixty teeth for the driving gear 187, and this will rotate the index gear at twice the speed of the driving gear and compensate for the ratio of the diameters of the index gear and the gear blank, which in the example in question is two to one.

It will be understood that hob cutters of different sizes may be employed according to the size of teeth desired to be cut on the gear blank.

The machine may be constructed to provide means for manually indexing the work, in order that one or more cuts or grooves may be made therein. These grooves might, for example, constitute the spaces between the teeth of a segmental gear. To accomplish this, in the present instance, a gear 217 (Fig. 10) may be mounted on a stub shaft 219 adapted to be inserted in a boss bearing 221 mounted on the live spindle head 141. Also mounted on said shaft is a disk 223 having a notch 225 (Fig. 13) therein adapted to be engaged by a dog 227 on a rod 229 mounted in a bore in a projection 231 on the boss bearing 221. The dog is urged outwardly by a coil spring 233 confined between the dog 227 and the end of the bore receiving the dog pin 229, the outward movement of the dog being limited by a hub 235 fast on said rod. An arm 237 projects up from said hub, and serves as a handle whereby the dog may be retracted or released as desired. The under side of the hub 235 may have a slabbed off face 239 adapted to engage a flat shoulder 241 formed on the boss bearing 221 to prevent rotation of the dog. The stub shaft 219 may project outward beyond the gear 217 and receive a crank handle 243.

When it is desired to substitute manual feed for automatic rotative feed of the work, the intermediate gear 169 on the arm 177 is swung up out of engagement with the driving gear 187. Then the stub shaft 219 may be inserted in the boss bearing 221, and the intermediate gear 169 may be rocked down into mesh with the gear 217 carried by the stub shaft.

The construction is such that on rotation of the crank handle 243, the gear 217 may be rotated, thereby causing the disk 223 to wipe past the end of the dog 228 until the notch 225 in the disk is brought into registration with the dog. Thereupon, the dog will spring outward and lock the disk and gear 217 against further rotative movement.

Rotation of the gear 217 will impart rotation to the intermediate gear 169, the index gear 165, and the latter through the spiral gears 159 and 161 will rotate the worm 155, the latter in turn will rotate the gear 153 fast on the live spindle, and this will rotate the work. Any suitable cutter may be substituted for the hob cutter to act on the work, or the hob cutter may be employed if desired. After the work has been fed past the cutter so as to cut, for example, a groove therein, the handle 237 may be operated to retract the dog 225 from the disk 223, thereupon permitting the crank handle 243 to be rotated again, in order to turn the gear 217 through a complete rotation. On such rotation the gear will be automatically arrested by the automatic movement of the dog 227 into the notch in the disk 223. This will impart a further increment of feed to the work, and another cut or groove may be formed therein. Similarly, the work may be indexed or advanced increments until as many grooves are cut thereon as desired.

Thus, by this simple construction, the manual feed may be readily substituted for the automatic rotative feed, or the automatic feed may be readily substituted for the manual feed as desired.

It will be understood that the invention is not limited to the specific embodiment shown, and that various deviations may be made therefrom without departing from the spirit and scope of the appended claims.

What is claimed is:—

1. In a machine of the character described, the combination of a hob cutter, a work support, a spindle mounted on said work support for rotating a gear blank to be acted upon by the hob cutter, a worm gear fast on said spindle, a worm meshing with said gear, a shaft mounted on said work support, spiral gears for imparting rotation from said shaft to said worm, an index gear detachably mounted on said shaft, a carrier fulcrumed on the axis of said index gear and adjustable to different positions, a driving gear, an intermediate gear on said carrier and adapted to mesh with said driving gear and index gear, and means for rotating said hob cutter and driving gear at the same speed.

2. In a machine of the character described, the combination of a standard, a spindle journalled thereon, a head mounted on said standard, means to hold said head in different positions of rotative adjustment, a shaft journalled in bearings on said head, a hob cutter on said shaft, bevel gears for imparting rotation from said spindle to said shaft, a knee mounted on said standard, a saddle on said knee, a table on said saddle, a transmission mechanism for feeding the table from said spindle, a head mounted on said table, a spindle journalled in said head and adapted to rotate a gear blank relatively to said cutter, and a transmission mechanism for imparting a rotative feed to said head spindle from said first-named spindle, and including an index gear detachably mounted in said transmission for determining the speed of rotation of the head spindle and gear blank relatively to said cutter.

3. In a machine of the character described, the combination of a hob cutter, means for rotating said cutter, a work support, means for supporting a gear blank thereon in position to be operated on by said cutter, and means to impart a rotative feed to the gear blank relatively to the cutter including a driving gear, an index gear for determining the number of teeth to be formed by the cutter on the blank, an intermediate gear, a carrier for the latter adjustably to bring the intermediate gear in mesh with the driving gear and index gears of different sizes, a shaft for said index gear, a worm, spiral gears for rotating said worm from said index gear shaft, a worm gear meshing with said worm, and a spindle rotated by said worm gear adapted operatively to be connected to the gear blank.

4. In a machine of the character described, the combination of a support, a carrier mounted on said support, a hob cutter on said carrier, means to hold said carrier in different positions of rotative adjustment, a work support, a spindle journalled on said work support and adapted to rotate a gear blank relatively to said hob cutter, and a transmission mechanism for imparting a rotative movement to said spindle including an index gear detachably mounted in said transmission and having a predetermined pitch ratio to the teeth to be formed by the cutter on the blank.

5. In a machine of the character described, the combination of a hob cutter, a work support, a spindle mounted on said work support for rotating a gear blank to be operated upon by said hob cutter, a driving gear, means to rotate the hob cutter and the driving gear at the same speed, and means to impart rotation from said driving gear to said spindle including a removable index gear for determining the rotative speed of the blank and provided with teeth having the same pitch as the teeth to be formed by the cutter on the blank.

6. In a machine of the character described, the combination of a hob cutter, a work support, a gear blank mounted on said work support in position to be acted upon by said hob cutter, and means to impart a rotative feed to said gear blank including a removable index gear provided with teeth having the same pitch as the teeth to be formed by the cutter on the blank.

7. In a machine of the character described, the combination of a hob cutter, means to rotate said cutter, a work support, a gear blank mounted on said work support in position to be acted upon by said cutter, and means to impart a rotative feed to said gear blank including a removable index gear for determining the speed of rotative feed of the blank and provided with teeth having a predetermined pitch ratio to the teeth to be formed by the cutter on the blank, said index gear being selected from a collection of such index gears of different sizes for alternative insertion in the machine.

In testimony whereof, I have signed my name to this specification.

RICHARD C. MONAHAN.